US010533124B2

United States Patent
Parton et al.

(10) Patent No.: US 10,533,124 B2
(45) Date of Patent: Jan. 14, 2020

(54) FOAMED CURABLE RESIN FLUIDS

(71) Applicant: Halliburton Energy Services, Inc., Houston, TX (US)

(72) Inventors: Christopher Parton, Humble, TX (US); Loan Vo, Houston, TX (US); Philip D. Nguyen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 350 days.

(21) Appl. No.: 15/314,449

(22) PCT Filed: Jul. 28, 2014

(86) PCT No.: PCT/US2014/048513
§ 371 (c)(1),
(2) Date: Nov. 28, 2016

(87) PCT Pub. No.: WO2016/018239
PCT Pub. Date: Feb. 4, 2016

(65) Prior Publication Data
US 2017/0198199 A1    Jul. 13, 2017

(51) Int. Cl.
*C09K 8/575* (2006.01)
*E21B 43/02* (2006.01)
(Continued)

(52) U.S. Cl.
CPC ............. *C09K 8/5751* (2013.01); *C08J 9/127* (2013.01); *C09K 8/508* (2013.01); *C09K 8/5086* (2013.01); *C09K 8/518* (2013.01); *C09K 8/5755* (2013.01); *C09K 8/805* (2013.01); *E21B 33/138* (2013.01); *E21B 43/025* (2013.01); *E21B 43/04* (2013.01); *E21B 43/267* (2013.01);
(Continued)

(58) Field of Classification Search
CPC .... C09K 8/518; C09K 8/5755; C09K 8/5086; E21B 43/26; C08J 2203/182; C08J 2363/00
See application file for complete search history.

(56) References Cited

U.S. PATENT DOCUMENTS 4,247,430 A    1/1981  Constien
4,460,627 A *  7/1984  Weaver .................... C09K 8/50
                                              427/212

(Continued)

FOREIGN PATENT DOCUMENTS

EP    1832566 A1    9/2007

OTHER PUBLICATIONS

Dictionary definitions of "emulsion" and "foam", accessed Dec. 7, 2018 via thefreedictionary.com.*

(Continued)

*Primary Examiner* — Blake E Michener
(74) *Attorney, Agent, or Firm* — McGuireWoods LLP

(57) ABSTRACT

A foamed treatment fluid comprising: an external phase, wherein the external phase comprises: (A) water; (B) a curable resin; and (C) a foaming agent; and an internal phase, wherein the internal phase comprises an inert gas. A method of treating particles of a particle pack located in a subterranean formation comprising: introducing the foam into the subterranean formation; and consolidating the particles of the particle pack after introduction into the subterranean formation.

20 Claims, 2 Drawing Sheets

(51) Int. Cl.
  *E21B 33/138*   (2006.01)
  *C09K 8/508*    (2006.01)
  *C09K 8/518*    (2006.01)
  *C09K 8/80*     (2006.01)
  *E21B 43/04*    (2006.01)
  *E21B 43/267*   (2006.01)
  *C08J 9/12*     (2006.01)
  *E21B 43/26*    (2006.01)

(52) U.S. Cl.
  CPC ...... *C08J 2203/182* (2013.01); *C08J 2363/00* (2013.01); *E21B 43/26* (2013.01)

(56) References Cited

U.S. PATENT DOCUMENTS

| | | | | |
|---|---|---|---|---|
| 4,585,064 | A * | 4/1986 | Graham | C09K 8/56 166/276 |
| 5,874,490 | A * | 2/1999 | Arora | C08G 59/066 523/404 |
| 6,045,873 | A | 4/2000 | Adachi et al. | |
| 6,316,512 | B1 | 11/2001 | Bambara et al. | |
| 6,582,819 | B2 * | 6/2003 | McDaniel | A63K 1/00 166/295 |
| 6,632,778 | B1 | 10/2003 | Ayoub et al. | |
| 6,995,210 | B2 | 2/2006 | Bouvy et al. | |
| 7,037,958 | B1 | 5/2006 | Hansen et al. | |
| 7,153,575 | B2 * | 12/2006 | Anderson | C09K 8/805 428/407 |
| 7,906,561 | B2 | 3/2011 | Hu et al. | |
| 2008/0196897 | A1 * | 8/2008 | Nguyen | C09K 8/502 166/295 |
| 2009/0151943 | A1 | 6/2009 | Nguyen et al. | |
| 2010/0160187 | A1 | 6/2010 | Nguyen et al. | |
| 2014/0000899 | A1 * | 1/2014 | Nevison | E21B 43/26 166/308.1 |
| 2016/0177162 | A1 * | 6/2016 | Nguyen | C09K 8/575 166/300 |
| 2016/0333669 | A1 * | 11/2016 | Mello | E21B 37/06 |
| 2017/0145282 | A1 * | 5/2017 | Shumway | C09K 8/035 |
| 2017/0158946 | A1 * | 6/2017 | Vo | C09K 8/26 |
| 2018/0030333 | A1 * | 2/2018 | Nguyen | C09K 8/62 |
| 2018/0066179 | A1 * | 3/2018 | Nguyen | C09K 8/64 |

OTHER PUBLICATIONS

Informational document on the tackifying agent sold under the name "SandWedge" by Halliburton (Year: 2007).*
Informational document on the tackifying agent sold under the name "SandWedge" by Halliburton (Year: 2012).*
International Search Report and Written Opinion dated Mar. 31, 2015; International PCT Application No. PCT/US2014/048513.

* cited by examiner

FOAMED CURABLE RESIN FLUIDS

TECHNICAL FIELD

Curable resins are used to consolidate particles of a particle pack. A curable resin system can include a curable resin, a curing agent, and/or a tackifying agent. The curable resin can be used in a variety of oil or gas operations, such as fracturing operations or gravel packing.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION OF THE INVENTION

Figure 1:
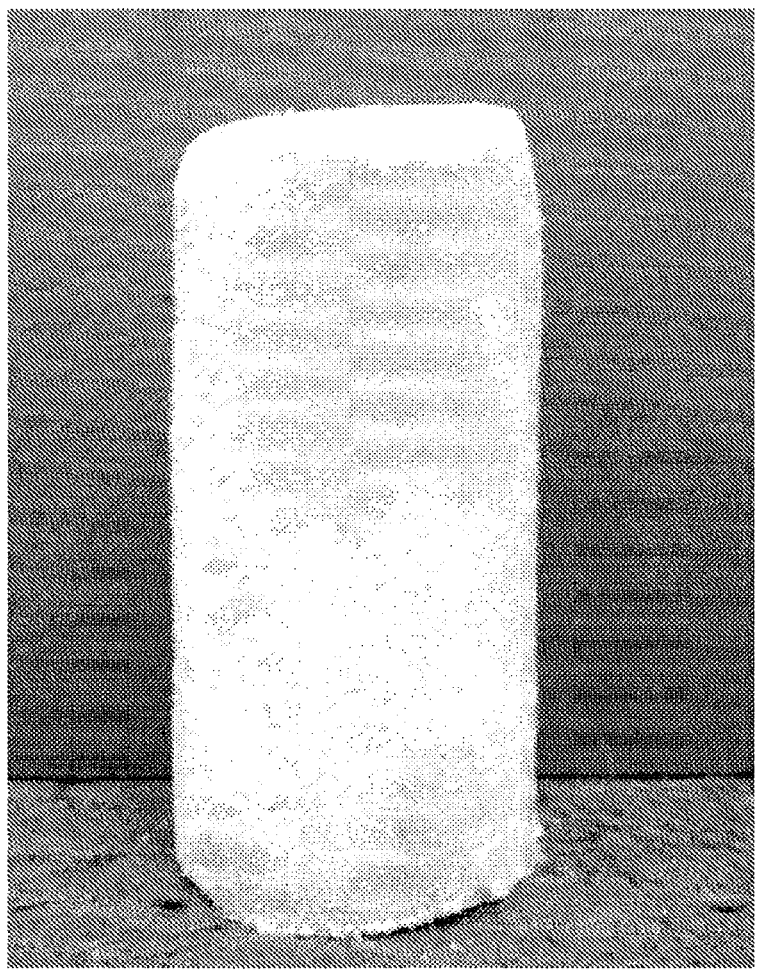
FIG. 1 is a photograph of a sand pack treated with a foamed curable resin system according to certain embodiments.

As used herein, the words "comprise," "have," "include," and all grammatical variations thereof are each intended to have an open, non-limiting meaning that does not exclude additional elements or steps.

As used herein, a "fluid" is a substance having a continuous phase that tends to flow and to conform to the outline of its container when the substance is tested at a temperature of 71° F. (22° C.) and a pressure of 1 atmosphere "atm" (0.1 megapascals "MPa"). A fluid can be a liquid or gas. A homogenous fluid has only one phase; whereas a heterogeneous fluid has more than one distinct phase. A heterogeneous fluid can be: a slurry, which includes an external liquid phase and undissolved solid particles as the internal phase; an emulsion, which includes an external liquid phase and at least one internal phase of immiscible liquid droplets; a foam, which includes an external liquid phase and a gas as the internal phase; or a mist, which includes an external gas phase and liquid droplets as the internal phase.

Oil and gas hydrocarbons are naturally occurring in some subterranean formations. In the oil and gas industry, a subterranean formation containing oil or gas is referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from the wellbore is called a reservoir fluid.

A well can include, without limitation, an oil, gas, or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered the region within approximately 100 feet radially of the wellbore. As used herein, "into a well" means and includes into any portion of the well, including into the wellbore or into the near-wellbore region via the wellbore. As used herein, "into a subterranean formation" means and includes into any portion of a subterranean formation including, into a well, wellbore, or the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

During wellbore operations, it is common to introduce a treatment fluid into the well. Examples of common treatment fluids include, but are not limited to, drilling fluids, spacer fluids, completion fluids, and work-over fluids. As used herein, a "treatment fluid" is a fluid designed and prepared to resolve a specific condition of a well or subterranean formation, such as for stimulation, isolation, gravel packing, or control of gas or water coning. The term "treatment fluid" refers to the specific composition of the fluid as it is being introduced into a well. The word "treatment" in the term "treatment fluid" does not necessarily imply any particular action by the fluid.

There are primary and remedial wellbore operations in which it is desirable to consolidate particles together. Examples of particles that are commonly consolidated together to form a consolidated pack of particles are proppant, gravel, and formation particles, such as sand and fines. Examples of wellbore operations that commonly use consolidated packs include fracturing, gravel packing, remedial proppant/gravel treatments, near-wellbore formation sand consolidation treatments for sand control, consolidating-while-drilling target intervals, and plugging-and-abandonment of wellbores in subterranean formations.

Proppant is commonly used in conjunction with hydraulic fracturing operations (fracing operations). A fracturing fluid is pumped using a frac pump at a sufficiently high flow rate and high pressure into the wellbore and into the subterranean formation to create or enhance a fracture in the subterranean formation. Creating a fracture means making a new fracture in the formation. Enhancing a fracture means enlarging a pre-existing fracture in the formation. The newly-created or enhanced fracture will tend to close together after pumping of the fracturing fluid has stopped. To prevent the fracture from closing, a material must be placed in the fracture to keep the fracture propped open. A material used for this purpose is often referred to as a "proppant." The proppant is in the form of solid particles, which can be suspended in the fracturing fluid, carried down hole, and deposited in the fracture as a "proppant pack." The proppant pack props the fracture in an open position while allowing fluid flow through the permeability of the pack.

Gravel is used in gravel packing operations. Gravel packing can be part of sand control techniques that are used to prevent production of particles from the subterranean formation, such as sand and fines. In gravel pack operations, a sand screen is placed in the wellbore and the surrounding annulus packed with prepared gravel of a specific size designed to prevent the passage of formation sand into the production tubing string. The primary objective is to stabilize the formation while causing minimal impairment to well productivity. Formation particles can also build up behind the sand screen to form a pack.

If the particles, such as the proppant or gravel are not held in place, then the particles can flow towards the wellhead during production. This undesirable migration can cause damage to wellbore equipment and potentially a loss of integrity, for example to the fracture or wellbore. Therefore, it is often desirable to coat the particles with a resin to form a consolidated pack. The resin should have an affinity for the particles and should coat the particles. The resin can be a tacky resin that acts as a glue to bind the particles of the pack together. The resin can also be part of a consolidation system that comprises a curable resin and a curing agent. The curing agent causes the curable resin to cure and become hard and solid via a chemical reaction, wherein heat can increase the reaction rate. After the resin cures, the particles of the pack are consolidated. The particles of a consolidated pack can then remain in the desired location either temporarily or permanently.

It is not uncommon for a wellbore to extend several hundreds of feet or several thousands of feet into a subterranean formation. The subterranean formation can have different zones. A zone is an interval of rock differentiated from surrounding rocks on the basis of its fossil content or other features, such as faults or fractures. For example, one zone can have a higher permeability compared to another zone. Being able to consolidate particles within an entire zone or even multiple zones having a different permeability can be challenging.

It has been discovered that a foam curable resin can be used to treat an entire zone or multiple zones of a subterranean formation. The foam resin can provide full coverage within the zone or zones. The foam resin can enter the area to be treated, even a highly porous area, stay in place, and possibly divert fluids and pressure to other areas within the wellbore or formation.

According to an embodiment, a foamed treatment fluid comprises: an external phase, wherein the external phase comprises: (A) water; (B) a curable resin; and (C) a foaming agent; and an internal phase, wherein the internal phase comprises an inert gas.

According to another embodiment, a method of treating particles of a particle pack located in a subterranean formation comprising: introducing the foam into the subterranean formation; and consolidating the particles of the particle pack after introduction into the subterranean formation.

It is to be understood that the discussion of preferred embodiments regarding the treatment fluid or any ingredient in the treatment fluid, is intended to apply to all of the method and composition embodiments. Any reference to the unit "gallons" means U.S. gallons.

The methods are for treating particles of a particle pack located in a subterranean formation. The particles of the particle pack can be any particles that are commonly consolidated in a subterranean formation. The particles can be proppant, gravel, subterranean formation particles, such as sand and/or fines, or combinations thereof. The subterranean formation can be part of a reservoir or adjacent to a reservoir. The subterranean formation can be penetrated by a wellbore. The particles of the particle pack can also be located within the wellbore, including an annulus of the wellbore.

The foamed treatment fluid includes an external phase and an internal phase. The foam can also include more than one internal phase, for example, insoluble particulates or solids. The external phase includes water. The water can be selected from the group consisting of freshwater, saltwater, sea water, brackish water, and combinations thereof. The water can also include dissolved substances or undissolved substances. For example, the water can contain a water-soluble salt. Examples of water-soluble salts include sodium chloride, calcium chloride, potassium chloride, magnesium chloride, potassium acetate, potassium formate, magnesium sulfate, and combinations thereof.

The external phase of the foam also includes a curable resin. The curable resin can be any compound that is capable of curing (i.e., the process of gaining compressive strength and becoming hard). Preferably, the curable resin is water dispersible. As used herein, the term "water dispersible" means that at least 1 part of the compound disperses in at least 5 parts of the water. The curable resin can cure via a chemical reaction with a curing agent or by heat. The curable resin can have an affinity for the particles of the particle pack. In this manner, the curable resin can be attracted to the particles. The curable resin can also coat the particles prior to curing. The curable resin can also chemically bond with the surfaces of the particles. According to certain embodiments, the curable resin is an epoxy silane resin. The curable resin can be an epoxy, diepoxy, or polyepoxy silane resin. For example, the curable resin can be bisphenol A glycidyldiepoxy or glycidyl propyltrimethoxysilane (GPTMS). As used herein, an "epoxy resin" is a compound that contains one epoxide functional group, a "diepoxy resin" is a compound containing two epoxide functional groups, and a "polyepoxy resin" is a compound that contains three or more epoxide functional groups. As used herein, a "silane" is a compound containing one or more silicon functional groups. Epoxy, diepoxy, and polyepoxy resins are a class of reactive pre-polymers and polymers which contain epoxide groups. As such, the curable resin can be polymer molecules.

The curable resin can be in a concentration in the range of about 0.5% to about 25% by volume of the external phase, preferably about 0.5% to about 5% by volume of the external phase. The curable resin can also be in a concentration such that the particles of the particle pack are consolidated.

The external phase of the foam also includes a foaming agent. As used herein, a "foaming agent" is a material that facilitates formation of a foam. According to certain embodiments, the foaming agent is a surfactant. A surfactant is an amphiphilic molecule comprising a hydrophobic tail group and a hydrophilic head group. The surfactant can reduce the surface tension of a liquid, which reduces the amount of work needed to create the foam, or increases its colloidal stability by inhibiting coalescence of bubbles. The foaming agent can be selected from the group consisting of an anionic, non-ionic, or cationic surfactant, and combinations thereof. Commercially-available examples of a suitable foaming agent is HC-2™ agent, HY-CLEAN™ (HC-2) surface-active suspending agent, PEN-5™ surface-active agent, and AQF-2™ foaming agent, marketed by Halliburton Energy Services, Inc. Additional examples of foaming agents that may be used include, but are not limited to, betaines; amine oxides; methyl ester sulfonates; alkylamidobetaines, such as cocoamidopropyl betaine; alpha-olefin sulfonate; trimethyltallowammonium chloride; $C_8$-$C_{22}$ alkylethoxylate sulfates; trimethylcocoammonium chloride, and combinations thereof.

The foaming agent can be in a concentration in the range of about 0.5% to about 25%, preferably about 0.5% to about 5% by volume of the external phase. The foaming agent can also be in at least a sufficient concentration such that a foam is created. The foaming agent can also be in a concentration such that at least a 10%, preferably at least a 40%, more preferably at least a 60%, quality of foam is created. As used herein, the phrase "quality of foam" means the percentage of the foamed fluid that is made up of the inert gas. By way of example, a 60% quality of foam means that the foam will have 60% by volume of the inert gas and 40% by volume of the liquid external phase.

The foam also includes the internal phase, wherein the internal phase comprises an inert gas. As used herein, an "inert gas" is a gas that does not chemically react with other substances under a given set of conditions. For example, the inert gas of the internal phase preferably does not chemically react with any of the components of the external phase or downhole fluids at the bottomhole temperature and pressure of the subterranean formation. Bottomhole means the location within the formation or wellbore where the foam becomes situated after introduction. The inert gas can be selected from the group consisting of, helium, nitrogen, neon, argon, carbon dioxide, atmospheric air, compounds of any of the foregoing, and combinations thereof in any proportion. Preferably, the inert gas is not highly flammable.

The foam can have about 10% to about 90% quality of foam (i.e., the internal phase is in a concentration in the range of about 10% to about 90% by volume of the external phase), preferably about 40% to about 90%, and more preferably about 60% to about 80% quality of foam. The quality of foam can also be selected based on certain desired properties of the foam. For example, a lower quality foam (i.e., a lower concentration of gas by volume of the external phase) can provide a greater concentration of the curable resin. A higher concentration of resin can be used to possibly provide a more thorough coating of the particles of the particle pack. By contrast, a higher quality of foam may disperse better and become situated more effectively in the area of the formation to be treated.

The foam can also include additional ingredients. For example, the external phase of the foam can also contain a curing agent, a tackifying agent, and/or the particles of the particle pack. The curing agent can be water-soluble. The curing agent can cause the curable resin to cure. The curing agent can be any curing agent that causes the exact curable resin to cure. For example, the curing agent can be a diamine silane, polyamine silane, or any water-soluble polyamine. The curing agent can be in a concentration in the range of about 0.5% to about 25% by volume of the external phase. The curing agent can also be in a concentration such that some of, preferably a majority of, and most preferably all of, the curable resin cures after introduction into the subterranean formation. The curing agent can also be in a concentration such that some of, preferably a majority of, and most preferably all of, the curable resin cures after a desired amount of time after introduction into the subterranean formation.

The foam can also include a tackifying agent. The tackifying agent can be water-soluble. A tackifying agent is a substance that possesses a sticky or tacky quality and is capable of binding particles together or catching particles as the particles flow by and make contact with the agent. The tackifying agent can be used to enhance the coating and anchoring of the curable resin onto the surfaces of the particles. The tackifying agent can be selected from the group consisting of, a hydrophobically-modified polyamide, a hydrophobically-modified polyamine/polyimine, polyamide, polyacrylamide, polyacrylate, dimer acids, trimer acids, and combinations thereof. A commercially-available example of a suitable tackifying agent is SANDWEDGE® ABC, aqueous-based conductivity enhancement system, marketed by Halliburton Energy Services, Inc. The tackifying agent can be in a concentration in the range of about 0.5% to about 5% by volume of the external phase.

The foam can also contain the particles of the particle pack, such as proppant or gravel. Accordingly, the step of introducing can further include introducing the particles of the particle pack into the subterranean formation.

Figure 2:
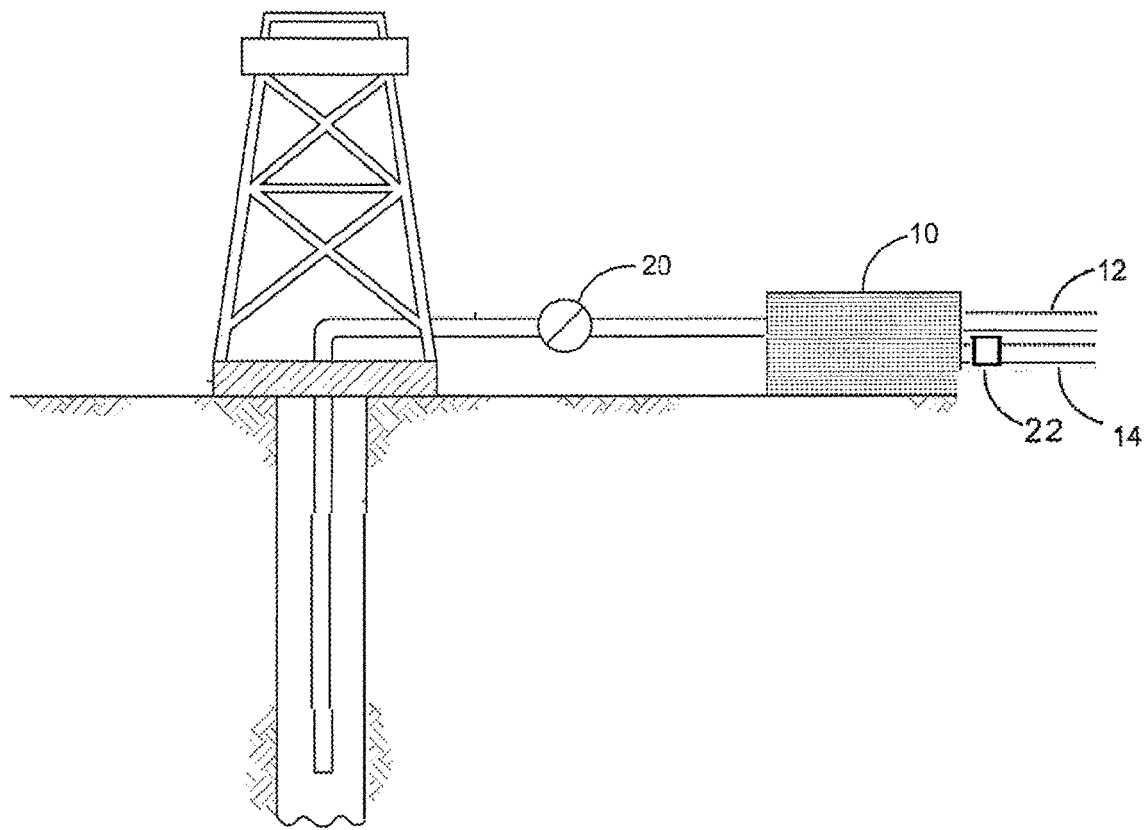
FIG. 2 illustrates an embodiment of system for preparation and delivery of a treatment fluid to a subterranean formation.

The methods can further include forming or preparing the foam prior to the step of introducing. The foam can be formed on the fly at the location of the well site. The step of forming can include mixing the external phase with the internal phase using a suitable mixing apparatus 10 (referring to FIG. 2). By way of example, the external phase can be flowed or injected into a mixing apparatus 10 (referring to FIG. 2) from a first pipeline 12 (referring to FIG. 2) and the inert gas can be flowed into the mixing apparatus 10 (referring to FIG. 2) from a second pipeline 14 (referring to FIG. 2). Each of the phases can have a specific flow rate. The flow rate of each of the phases may be adjusted by a flow rate control apparatus 22 (referring to FIG. 2). In an embodiment, the flow rate control apparatus may by any suitable valve or joint capable of regulating the pressure or flow rate of each phase. The flow rate of the external phase and the inert gas internal phase can be adjusted to provide a desired quality of foam. For example, if a 60% quality of foam is desired, then the flow rate of the inert gas may be greater than if a 30% quality of foam is desired, while the flow rate of the external phase can remain the same or even decrease. In this manner, a larger volume of the gas will make up the foamed fluid. The mixing apparatus can be any suitable apparatus that is used to form a foam. For example, the mixing apparatus can include a pressurized cell wherein the external phase and inert gas are flowed into. The pressure of the cell can be decreased after the phases are flowed into the cell, thereby allowing the expansion of the liquid external phase with the gas to form the foam.

The methods include introducing the foam into the subterranean formation. In an embodiment, the step of introducing comprises using one or more pumps 20 (referring to FIG. 2). The subterranean formation can have two or more zones. The foam can be introduced into at least one zone. Preferably, the foam provides complete coverage for the entire zone. The foam can also be introduced into more than one zone. A first foam can also be introduced into one zone and a second foam can be introduced into another zone, wherein the ingredients making up the foams can be different. According to certain embodiments, once introduced into the formation, the foam becomes situated in the location to be treated and does not substantially penetrate into the formation, for example highly-permeable areas of the formation. In this manner, the foam can remain in place and form the consolidated particle pack. The foam can also function to divert other wellbore fluids elsewhere within the formation or wellbore.

The step of introducing can also include introducing the foam into a well, wherein the well penetrates the subterranean formation. The well can be, without limitation, an oil, gas, or water production well, an injection well, or a geothermal well. The well can also be an offshore well. The particles can already be located within the subterranean formation prior to the step of introducing. The treatment fluid foam can be used for any of the following oil or gas operations, fracturing, gravel packing, remedial proppant/gravel treatments, near-wellbore formation sand consolidation treatments for sand control, consolidating-while-drilling target intervals, and plugging-and-abandonment of wellbores in subterranean formations. The step of introducing can also include creating or extending one or more fractures in the subterranean formation.

The methods also include consolidating the particles of the particle pack after introduction into the subterranean formation. The step of consolidating can include coating the resin onto the particles. The step of consolidating can also include causing or allowing the curable resin to cure. The step of causing can include introducing a heated fluid or a curing agent into the formation. The step of allowing can include a cessation of pumping a cooling fluid, whereby the temperature surrounding the foam is allowed to increase due to a higher temperature subterranean formation. The step of allowing can also include allowing a curing agent to cause the curable resin to cure, wherein the external phase includes the curing agent.

Examples

To facilitate a better understanding of the preferred embodiments, the following examples of certain aspects of the preferred embodiments are given. The following examples are not the only examples that could be given according to the preferred embodiments and are not intended to limit the scope of the invention.

A sand pack comprising Oklahoma #1 sand was packed into a brass cell measuring 1 inch by 4 inches. The sand pack was heated to a temperature at 180° F. (82° C.) and saturated with a solution of 3% by weight of potassium chloride (KCl) salt dissolved in freshwater. An external phase was prepared by mixing 3% by volume of the external phase of HC-2™ foaming agent, 2% by volume of the external phase of SANDWEDGE® ABC, aqueous-based conductivity enhancement system as the tackifying agent, 4% by volume of the external phase of glycidyl propyltrimethoxysilane (GPTMS) as the curable resin, 2% by volume of the external phase of trimethoxysilylpropylethylenediamine (TMSPED) as the curing agent, and 89 mL of the 3% KCl salt-water solution. The foam was formed by mixing the external phase with nitrogen ($N_2$) gas as the internal phase. The sand pack was treated with the foam until a total of 200 milliliters of the external phase had come in contact with the sand pack particles at a temperature of 180° F. (82° C.). The treated sand pack was then shut in overnight at a temperature of 180° F. (82° C.). The treated sand pack was then removed from the brass cell and a photograph was taken.

FIG. 1 is the photograph of the treated sand pack. As can be seen in the photograph, the foamed resin provided very good coverage throughout the entire sand pack. The foam also provided excellent consolidation of the sand pack. This indicates that the foam can be used to provide excellent coverage and consolidation to particles of a particle pack.

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used generate, store, monitor, regulate, and/or recondition the exemplary fluids and additives. The disclosed fluids and additives may also directly or indirectly affect any transport or delivery equipment used to convey the fluids and additives to a well site or downhole such as, for example, any transport vessels, conduits, pipelines, trucks, tubulars, and/or pipes used to fluidically move the fluids and additives from one location to another, any pumps, compressors, or motors (e.g., topside or downhole) used to drive the fluids and additives into motion, any valves or related joints used to regulate the pressure or flow rate of the fluids, and any sensors (i.e., pressure and temperature), gauges, and/or combinations thereof, and the like. The disclosed fluids and additives may also directly or indirectly affect the various downhole equipment and tools that may come into contact with the fluids and additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of treating particles of a particle pack located in a subterranean formation comprising:
    forming a foam at a well site, wherein the foam comprises:
        (A) an external phase, wherein the external phase comprises:
            (i) water;
            (ii) a curable resin, wherein the curable resin is water-dispersible, wherein the curable resin is a bisphenol A glycidyldiepoxy or a glycidyl propyltrimethoxysilane;
            (iii) a foaming agent; and
            (iv) a tackifying agent; and
        (B) an internal phase, wherein the internal phase comprises an inert gas; and
    consolidating the particles of the particle pack after introduction into the subterranean formation;
    introducing the foam into the subterranean formation.

2. The method according to claim 1, wherein the particles are selected from the group consisting of proppant, gravel, subterranean formation particles, or combinations thereof.

3. The method according to claim 1, wherein the curable resin coats the particles prior to consolidating.

4. The method according to claim 1, wherein the water is selected from the group consisting of freshwater, saltwater, sea water, brackish water, and combinations thereof.

5. The method according to claim 1, wherein the curable resin is in a concentration in the range of 0.5% to 25% by volume of the external phase.

6. The method according to claim 1, wherein the foaming agent is a surfactant.

7. The method according to claim 1, wherein the foaming agent is selected from the group consisting of, betaines; amine oxides; methyl ester sulfonates; alkylamidobetaines, cocoamidopropyl betaine; alpha-olefin sulfonate; trimethyltallowammonium chloride; $C_8$-$C_{22}$ alkylethoxylate sulfates; trimethylcocoammonium chloride; and combinations thereof.

8. The method according to claim 1, wherein the foaming agent is in a concentration in the range of 0.5% to 25% by volume of the external phase.

9. The method according to claim 1, wherein the inert gas is selected from the group consisting of, helium, nitrogen, neon, argon, carbon dioxide, and combinations thereof in any proportion.

10. The method according to claim 1, wherein the foam further comprises at least one additional ingredient.

11. The method according to claim 10, wherein the additional ingredients include a curing agent.

12. The method according to claim 1, wherein the step of forming comprises mixing the external phase with the internal phase using a mixing apparatus.

13. The method according to claim 12, wherein the external phase is flowed into the mixing apparatus from a first pipeline and the inert gas is flowed into the mixing apparatus from a second pipeline.

14. The method according to claim 13, wherein the flow rate of the external phase and the inert gas internal phase is adjusted to provide a desired quality of foam.

15. The method according to claim 1, wherein the step of consolidating comprises causing or allowing the curable resin to cure.

16. The method according to claim 1, wherein the step of introducing comprises using one or more pumps.

17. The method according to claim 1, wherein the tackifying agent is selected from the group consisting of, a hydrophobically-modified polyamide, a hydrophobically-modified polyamine/polyimine, polyacrylamide, polyacrylate, dimer acids, trimer acids, and combinations thereof.

18. A foamed treatment fluid comprising:
an external phase, wherein the external phase comprises:
(A) water;
(B) a curable resin, wherein the curable resin is water-dispersible, wherein the curable resin comprises a bisphenol A glycidyldiepoxy or a glycidyl propyltrimethoxysilane;
(C) a foaming agent; and
(D) a tackifying agent; and
an internal phase, wherein the internal phase comprises an inert gas.

19. The foamed treatment fluid according to claim 18, wherein the curable resin is an epoxy silane resin.

20. The foamed treatment fluid according to claim 18, wherein the tackifying agent is selected from the group consisting of, a hydrophobically-modified polyamide, a hydrophobically-modified polyamine/polyimine, polyacrylamide, polyacrylate, dimer acids, trimer acids, and combinations thereof.

* * * * *